(12) United States Patent
Gidon

(10) Patent No.: US 6,718,079 B1
(45) Date of Patent: Apr. 6, 2004

(54) OPTICAL CONNECTION FOR AN INTEGRATED ELECTRONIC CIRCUIT AND APPLICATION TO INTERCONNECTIONS OF SUCH CIRCUITS

(75) Inventor: Serge Gidon, La Marette (FR)

(73) Assignee: Commissariat a l'Energie Atomique, Paris (FR)

(*) Notice: Subject to any disclaimer, the term of this patent is extended or adjusted under 35 U.S.C. 154(b) by 81 days.

(21) Appl. No.: 10/019,428

(22) PCT Filed: Jun. 27, 2000

(86) PCT No.: PCT/FR00/01794

§ 371 (c)(1),
(2), (4) Date: Dec. 31, 2001

(87) PCT Pub. No.: WO01/01181

PCT Pub. Date: Jan. 4, 2001

(30) Foreign Application Priority Data

Jun. 29, 1999 (FR) .............................. 99 08307

(51) Int. Cl.$^7$ ................................. G02B 6/12
(52) U.S. Cl. ........................................ 385/14
(58) Field of Search ................ 385/14, 24; 372/95, 372/108

(56) References Cited

U.S. PATENT DOCUMENTS

4,930,138 A * 5/1990 Opower ..................... 372/95
5,835,646 A   11/1998 Yoshimura et al.
5,987,050 A * 11/1999 Doerr et al. ............... 372/108

FOREIGN PATENT DOCUMENTS

| DE | 195 23 580 | 2/1996 |
|----|------------|--------|
| EP | 0 617 314  | 9/1994 |
| WO | 93/09456   | 5/1993 |

OTHER PUBLICATIONS

"Optical Fiber Bragg Gratings Have a Wide Variety of Uses", by Anish Goyal and Martin Muendel, Photonics Spectra, Sep. 1998, pp. 116–121.

* cited by examiner

Primary Examiner—Ellen E. Kim
(74) Attorney, Agent, or Firm—Oblon, Spivak, McClelland, Maier & Neustadt, P.C.

(57) ABSTRACT

An optical connection for an integrated electronic circuit and application to interconnections of such circuits. The optical connection includes an optical circuit including an optical waveguide and an optoelectronic component coupled with the optical waveguide. The optical circuit is connected to the integrated electronic circuit by a purely electrical link between the optoelectronic component and the integrated electronic circuit.

20 Claims, 2 Drawing Sheets

OPTICAL CONNECTION FOR AN INTEGRATED ELECTRONIC CIRCUIT AND APPLICATION TO INTERCONNECTIONS OF SUCH CIRCUITS

TECHNICAL FIELD

The present invention relates to an optical connection for an integrated electronic circuit and is in particular, applied to interconnections of such circuits.

STATE OF THE PRIOR ART

The need for increasingly higher rates for operating integrated electronic circuits leads to increasingly higher integration of these circuits. This integration finds its limits in the unavoidable increase in the size of the circuits, which leads to an increase in cost of the latter (because of a reduction of the manufacturing cost-effectiveness). A compromise then imposes interconnections of integrated electronic circuits of reasonable size.

It is known how to connect two integrated electronic circuits to each other via electrical links. However, with the increase in operating rates of the circuits (clock frequencies above 500 MHz), electromagnetic coupling phenomena occur between parallel electrical conductors, couplings which induce a deterioration of the signal/noise ratio and risks of malfunction.

It is also known how to use optical links instead of electrical conductors, these optical links providing better separation between transmission channels.

Such optical links comprise light transmitters and receivers as well as link channels.

The link channels may use holograms or slightly confined overhead bundles or even optical fibers. The light transmitters and receivers are mounted on integrated electronic circuits which are to be interconnected and are electrically connected to these circuits. It is specified that the transmitters are generally vertical cavity surface emission lasers (VCSEL) which only occupy a small surface on the substrates on which they are mounted and have a low threshold current.

FIG. 1 schematically illustrates an known interconnection between two integrated electronic circuits 2 and 4. An optoelectronic component 6 is electrically connected to the integrated circuit 2 via microbeads of solder 8. Another optoelectronic component 10 is electrically connected to the integrated circuit 4 via microbeads of solder 12.

An optical circuit 14 formed on a substrate 15 and comprising an optical waveguide 16 is provided for optically connecting the optoelectronic components 6 and 10 to each other.

Component 6 is for example a light transmitter whereas component 10 is a light receiver.

Electrical signals transmitted by the circuit 2 are then converted into light signals by component 6. These light signals propagate in the optical waveguide 16 and are detected by component 10 which reconverts these light signals into electrical signals. The integrated circuit 4 receives the latter. So, an interconnection is actually available between circuits 2 and 4.

However, optical interconnections between integrated electronic circuits of the interconnection type of FIG. 1 have a drawback: these interconnections require great accuracy for "aligning", i.e., optically coupling, optical link channels with light transmitters and receivers. For example, in the case of FIG. 1, great accuracy is required for optical coupling between the optical waveguide 14 and component 6 or even component 10.

DISCLOSURE OF THE INVENTION

The object of the present invention is to overcome the above drawback by providing an interconnection of integrated electronic circuits which is easier to produce than known interconnections, as mentioned above, as it requires alignments with less accuracy.

More generally, the present invention relates to an optical connection for an integrated electronic circuit, the making of which uses coupling of an electronic type, coupling which requires less accuracy than optical coupling.

Specifically, the object of the present invention is an optical connection for an integrated electronic circuit, this optical connection being characterized in that it comprises an optical circuit formed on a substrate and comprising an optical waveguide and an optoelectronic component which is optically coupled to the optical waveguide and has at least either of the two electronic-optical converter and optoelectronic converter functions, and in that the optical circuit is connected to the integrated electronic circuit via a purely electrical link between the optoelectronic component and the integrated electronic circuit in order to convert the electrical signals transmitted by the integrated electronic circuit into optical signals which then propagate in the optical waveguide and/or to convert such optical signals into electrical signals which are then received by the integrated electronic circuit.

The object of the present invention is also an optical connection between first and second integrated electronic circuits, this optical connection being characterized in that it comprises an optical circuit formed on a substrate and comprising an optical waveguide and first and second optoelectronic components which are optically coupled with the optical waveguide, the first optoelectronic component having at least either of the two electronic-optical converter and optoelectronic converter functions, and the second optoelectronic component having at least either of the two optoelectronic and electronic/optical converter functions and in that the optical circuit is connected to the first and second integrated electronic circuits via purely electrical links between the first and second optoelectronic components and the first and second integrated electronic circuits respectively so that electrical signals transmitted by the first and/or second integrated electronic circuits are converted into optical signals which then propagate in the optical waveguide and are then reconverted into electronic signals, the latter being then received by the second and/or first integrated electronic circuit.

In the invention, each electronic-optical converter is a laser comprising a resonant cavity delimited by two mirrors which are formed on the optical waveguide and an amplifying medium placed in a recess formed across this optical waveguide between both mirrors.

First and second integrated electronic circuits may be formed on different substrates or conversely on the same substrate, respectively.

Preferably, the optical circuit and each integrated electronic circuit are made from materials substantially having the same thermal expansion coefficient.

Each purely electrical link may be made by means of microbeads of a fusible material.

Both mirrors may be Bragg gratings which are photoengraved or etched on the optical waveguide.

Alternatively, each mirror may be a slot which crosses the optical waveguide.

Preferably, the space between the amplifying medium and the whole of the recess contains an optical index adapter, a fluid or a gel for example.

BRIEF DESCRIPTION OF THE DRAWINGS

The present invention will be better understood upon reading the description of exemplary embodiments given hereafter, purely indicative and by no means limiting, with reference to the appended drawings wherein.

DETAILED DESCRIPTION OF PARTICULAR EMBODIMENTS

In the present invention, integrated optics techniques are used for making optical interconnections of integrated electronic circuits.

An integrated optical circuit provides a physical link between these integrated electronic circuits.

Techniques from integrated optics enable optical waveguides with dimensions of generally a few microns to be made in a stacking of etched layers (optionally partly etched). Two neighboring optical waveguides are likely to be subject to crosstalk which is low when the distance between these optical waveguides is greater than the extent of the evanescent field which is generally 10 µm.

Further, as light naturally tends to propagate in a straight line, crossings may be formed between the optical waveguides with low crossing losses and little crosstalk.

Optical waveguides are therefore suitable for making links for optical interconnections.

Techniques of integrated optics may be implemented with materials such as InP, AsGa, $SiO_2$ and Si. Such materials may be used in the present invention for forming the optical circuit.

In the invention, it is advantageous to use materials substantially having the same thermal expansion coefficients for making the optical circuit and the integrated electronic circuit. For example, if the latter are in silicon, it is preferable to form the optical circuit also from silicon.

Figure 2:
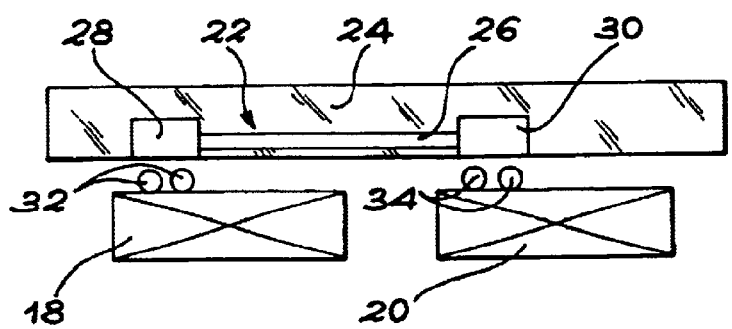
FIG. 2 is a schematic cross-sectional view of an optical interconnection of two integrated electronic circuits, which is made according to the present invention.

The optical interconnection of FIG. 2 is for connecting two integrated electronic circuits 18 and 20 to each other. This optical interconnection comprises an optical circuit 22 formed on a substrate 24 and comprising an optical waveguide 26 as well as two optoelectronic components 28 and 30 which are optically coupled with both ends of the optical waveguide 26, respectively and are associated with circuits 18 and 20, respectively.

The optical circuit 22 is connected to these circuits 18 and 20 through components 28 and 30, these links being purely electrical and for example, made from microbeads 32 and 34, made out of a fusible material, indium for example. There are other techniques, in particular, the use of polymers with anisotropic conduction.

Figure 1:
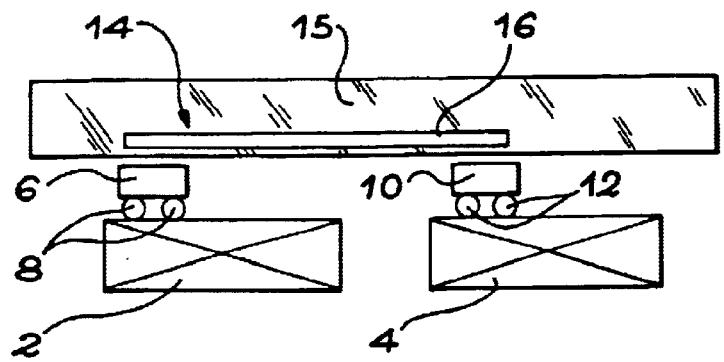
FIG. 1 is a schematic cross-sectional view of a known optical interconnection of two integrated electronic circuits and it has already been described.

The space that is seen in FIG. 2 between the microbeads and the optical circuit, does not exist, of course; this space was left in FIG. 2 so as to better compare the latter with FIG. 1.

It is assumed that circuit 18 is for sending information to circuit 20. In this case, component 28 is an electronic-optical converter, a laser diode for example, which converts electrical signals that it receives from circuit 18 via the microbeads 32, into optical signals. The latter are then transmitted via the guide 26 to component 30 which, in this case, is an opto-electrical converter, for example a photodiode. The latter reconverts these optical signals into electrical signals which are then received by circuit 20, via the microbeads 34.

When circuit 20 is for sending information to circuit 18, an electronic-optical converter is used as component 30 and an opto-electrical converter is used as component 28. The information transmitted by circuit 20 as electrical signals is then received by circuit 18 after having been converted into optical signals by the component 30, then back again into electrical signals by component 28.

When circuits 18 and 20 are for exchanging information with one another, circuit 18 then sending information to circuit 20 and vice versa, components 28 and 30 having the double function of electronic-optical converter and opto-electrical converter are used. "Downline" links and other "upline" links may also be provided.

Hybridization of components 28 and 30 with their respective circuits 18 and 20, for example via microbeads 32 and 34, require less positioning accuracy than that required by the positioning of the optical circuit 14 of FIG. 1 with respect to components 6 and 10.

When the integrated electronic circuit and the optical circuit are formed from silicon, a rather unsuitable material for producing optical sources because of its indirect gap, it is then suitable to use light transmitters hybridized with the optical circuit and formed for example from a semiconducting material with a direct gap such as GaAs. For this hybridization, any conventional assembly technique may be used such as by adherence, bonding or metal fusion.

In this case, for optically coupling the light transmitter with the optical waveguide, the optical waveguide is made so as to specifically contribute to the light emission of this transmitter. Positioning constraints on the transmitter are thus reduced as compared with the optical waveguide.

To do this, a laser is produced with a cavity comprising a portion of the optical waveguide: the mirrors of this cavity are formed on this optical waveguide and a laser amplifying medium is introduced into the guide.

Figure 3:
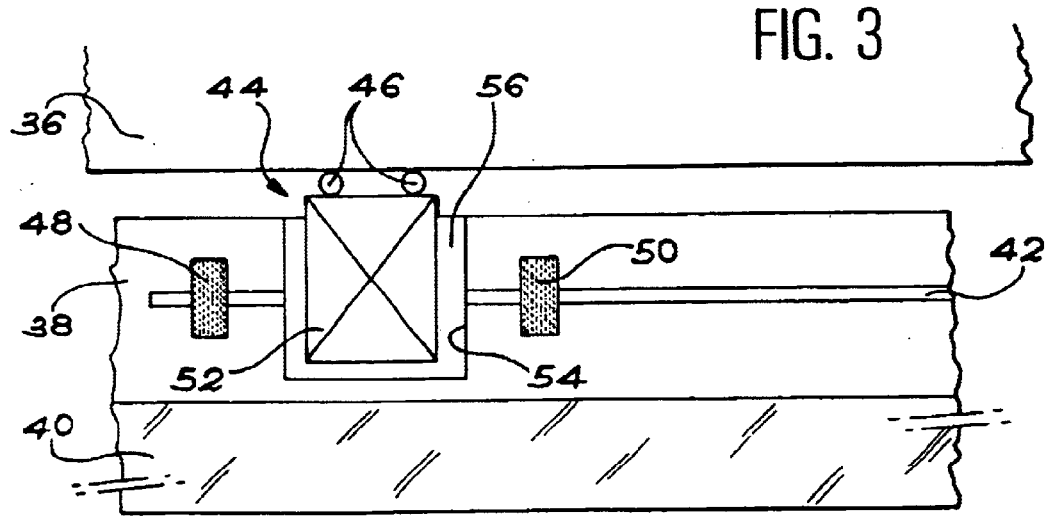
FIGS. 3, 4 and 5 are schematic cross-sectional views of other optical interconnections performed according to the invention.

This is schematically illustrated by the example of FIG. 3 where an integrated circuit 36 is shown for sending information to another integrated circuit (not shown) via an optical circuit 38 formed on a substrate 40 and comprising an optical waveguide 42 as well as a laser 44 which forms an electro-optical converter.

This laser 44 is controlled by integrated circuit 36 and connected to the latter by a purely electrical link produced for example by means of microbeads 46 made out of fusible material.

Laser 44 comprises a resonant cavity delimited by two mirrors 48 and 50, which are formed on the optical waveguide 42, as well as a semiconducting amplifying medium 52 which is placed in the vicinity of the guide, for example in a recess 54 formed in the optical circuit 38, across this optical waveguide 42 and between both mirrors 48 and 50.

The laser of FIG. 3 is provided with electrodes (not shown) for exciting the amplifying medium. These electrodes are connected to the integrated electronic circuit 36 via microbeads.

The space 56 between the amplifying medium and the wall of the recess is preferably filled with an index matching material, for example a fluid or a gel for favoring optical coupling between this amplifying medium and the optical waveguide 42.

Different materials may be contemplated for forming the amplifying medium 52. For example, semiconducting materials with quantum wells may be used of the type which are used in VCSELs and they comprise several confinement layers (wells).

Figure 4:
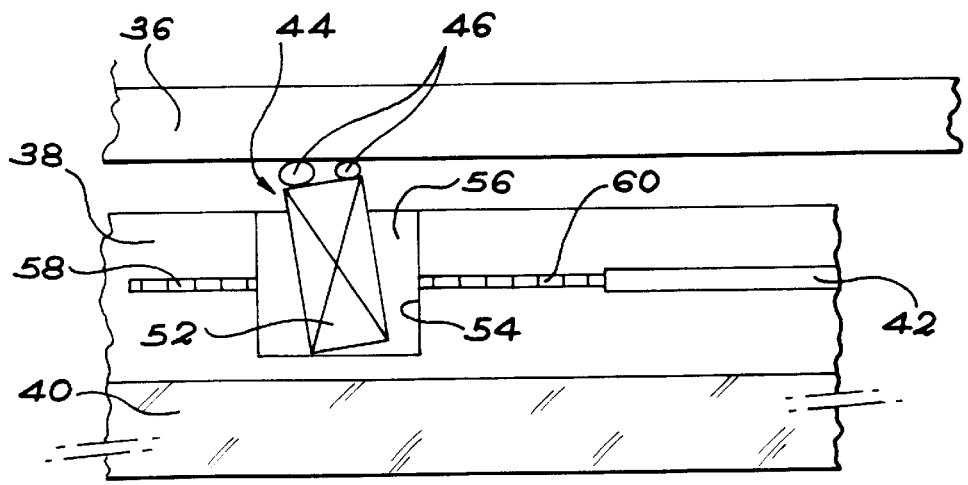

These layers may be made in such a way that they are more or less inclined with respect to the wall of the recess 54 (FIG. 4) in order to comply with positioning tolerance and the desired gain for the laser. This gain depends on the reflection coefficient of the mirrors which delimit the cavity of the laser.

When an integrated optics technique of the silica-on-silicon type is used, it is advantageous to use mirrors formed by Bragg diffraction gratings 58 and 60 (FIG. 4) which are photo-engraved on the optical waveguide 42.

As regards mirrors formed from Bragg gratings, reference will be made to the following document, for example:

A. Goyal and M. Muendel, Photonics Spepctra, September 1998, pages 116–121.

Figure 5:
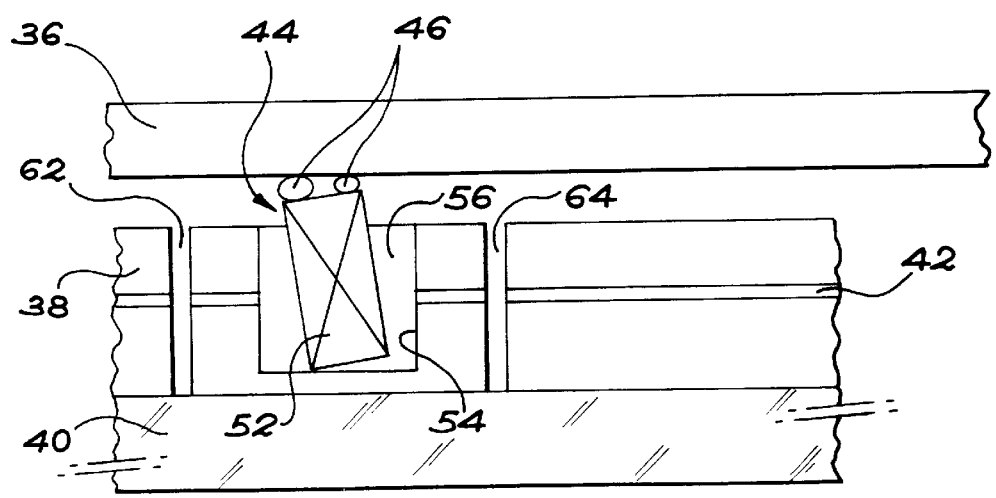

When the optical waveguide is formed from a material with a large optical index, for example by a technique of the silicon-on-insulator type, wherein a silicon layer for guiding light is between two silica layers, the mirrors may be slots 62 and 64 (FIG. 5) formed in the optical circuit, across the optical waveguide 42 and perpendicularly to the latter, on both sides of the recess 54 in which the amplifying medium 52 is found. Reflections of light then occur at the air-slot wall interfaces.

The invention is not limited to the interconnection of two integrated electronic circuits formed on two different substrates (inter-chip interconnection) as illustrated in FIG. 2. It also applies to the interconnection of two integrated circuits formed on a same substrate (intra-chip interconnection).

Further, the invention is not limited to the interconnection of two integrated electronic circuits. It is also applied to the optical connection of an integrated electronic circuit by means of an optical circuit formed on a substrate and further comprising an optical waveguide as well as an optoelectronic component which is optically coupled with this optical waveguide and which is connected to the integrated electronic circuit via a purely electrical link between this component and this integrated electronic circuit.

When the component is for example an electronic-optical converter, this enables electrical signals transmitted by the integrated electronic circuit to be converted into light signals which then propagate in the waveguide.

Conversely, by using an opto-electrical converter, the latter is able to receive light signals propagating in the optical waveguide and converting them into electrical signals which are then received by the integrated electronic circuit.

Such a connection finds applications to the inputs/outputs of an integrated electronic circuit: light signals may be injected by any means in the optical waveguide and received as electrical signals by the integrated circuit or, conversely, this integrated electronic circuit may transmit electrical signals which are then converted into optical signals, which propagate in the optical waveguide and may then be detected by a photodetector optically coupled with this optical waveguide by any suitable means.

What is claimed is:

1. An optical connection for an integrated electronic circuit, this optical connection comprising an optical circuit formed on a substrate and comprising an optical waveguide and an optoelectronic component which is optically coupled with the optical waveguide and has an electronic-optical converter function, and the optical circuit is connected to the integrated electronic circuit by a purely electrical link between the optoelectronic component and the integrated electronic circuit so as to convert electrical signals transmitted by the integrated electronic circuit into optical signals which then propagate in the optical waveguide, each electronic-optical converter being a laser comprising a resonant cavity delimited by two mirrors which are formed on the optical waveguide and an amplifying medium placed in a recess formed across the optical waveguide between the two mirrors.

2. The connection according to claim 1, wherein the optical circuit and each integrated electronic circuit are made from materials having substantially a same thermal expansion coefficient.

3. The connection according to claim 1, wherein each purely electrical link is made by means of microbeads of a fusible material.

4. The connection according to claim 1, wherein the two mirrors are Bragg gratings which are photo-engraved or etched on the optical waveguide.

5. The connection according to claim 1, wherein each mirror is a slot which crosses the optical waveguide.

6. The connection according to claim 1, wherein a space between the amplifying medium and a wall of the recess contains an optical index adapter.

7. An optical connection for an integrated electronic circuit, this optical connection comprising an optical circuit formed on a substrate and comprising an optical waveguide and an optoelectronic component which is optically coupled with the optical waveguide and has two electronic-optical and optoelectronic converter functions, and the optical circuit is connected to the integrated electronic circuit by a purely electrical link between the optoelectronic component and the integrated electronic circuit so as to convert electrical signals transmitted by the integrated electronic circuit into optical signals which then propagate in the optical waveguide and to convert such optical signals into electrical signals which are then received by the integrated electronic circuit, each electronic-optical converter being a laser comprising a resonant cavity delimited by two mirrors which are formed on the optical waveguide and an amplifying medium placed in a recess formed across the optical waveguide between the two mirrors.

8. The connection according to claim 7, wherein the optical circuit and each integrated electronic circuit are made from materials having substantially a same thermal expansion coefficient.

9. The connection according to claim 7, wherein each purely electrical link is made by means of microbeads of a fusible material.

10. The connection according to claim 7, wherein the two mirrors are Bragg gratings which are photo-engraved or etched on the optical waveguide.

11. The connection according to claim 7, wherein each mirror is a slot which crosses the optical waveguide.

12. The connection according to claim 7, wherein a space between the amplifying medium and a wall of the recess contains an optical index adapter.

13. An optical connection between first and second integrated electronic circuits, this optical connection comprising an optical circuit formed on a substrate and comprising an optical waveguide and first and second optoelectronic components which are optically coupled with the optical waveguide, the first optoelectronic component having at least either of the two electronic-optical and optoelectronic converter functions and the second optoelectronic component having an optoelectronic converter function when the first component has the electronic-optical converter function or an electronic-optical converter function when the first component has the optoelectronic converter function or both latter functions, and the optical circuit is connected to the first and second integrated electronic circuit by purely electrical links between the first and second optoelectronic components and the first and second integrated electronic circuits respectively, so that electrical signals transmitted by at least one of the first and the second integrated electronic circuit are converted into optical signals which then propagate in the optical waveguide and are then reconverted into electrical signals, the electrical signals being then received by at least one of the second and first integrated electronic circuit, each electronic-optical converter being a laser comprising a resonant cavity delimited by two mirrors which are formed on the optical waveguide and an amplifying medium placed in a recess formed across this optical waveguide between the two mirrors.

14. The connection according to claim 13, wherein the first and second integrated electronic circuits are formed on different substrates, respectively.

15. The connection according to claim 13, wherein the first and second integrated electronic circuits are formed on a same substrate.

16. The connection according to claim 13, wherein the optical circuit and each integrated electronic circuit are made from materials having substantially a same thermal expansion coefficient.

17. The connection according to claim 13, wherein each purely electrical link is made by means of microbeads of a fusible material.

18. The connection according to claim 13, wherein the two mirrors are Bragg gratings which are photo-engraved or etched on the optical waveguide.

19. The connection according to claim 13, wherein each mirror is a slot which crosses the optical waveguide.

20. The connection according to claim 13, wherein a space between the amplifying medium and a wall of the recess contains an optical index adapter.

* * * * *